United States Patent Office 2,937,059
Patented May 17, 1960

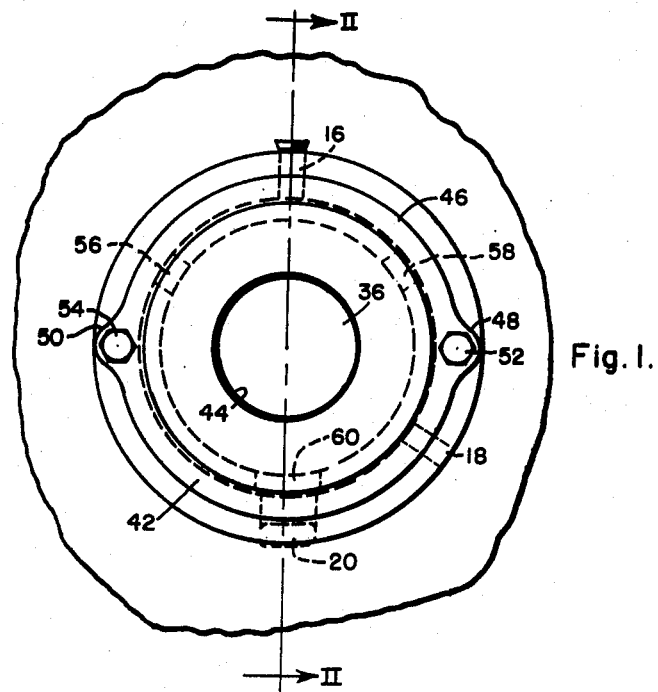
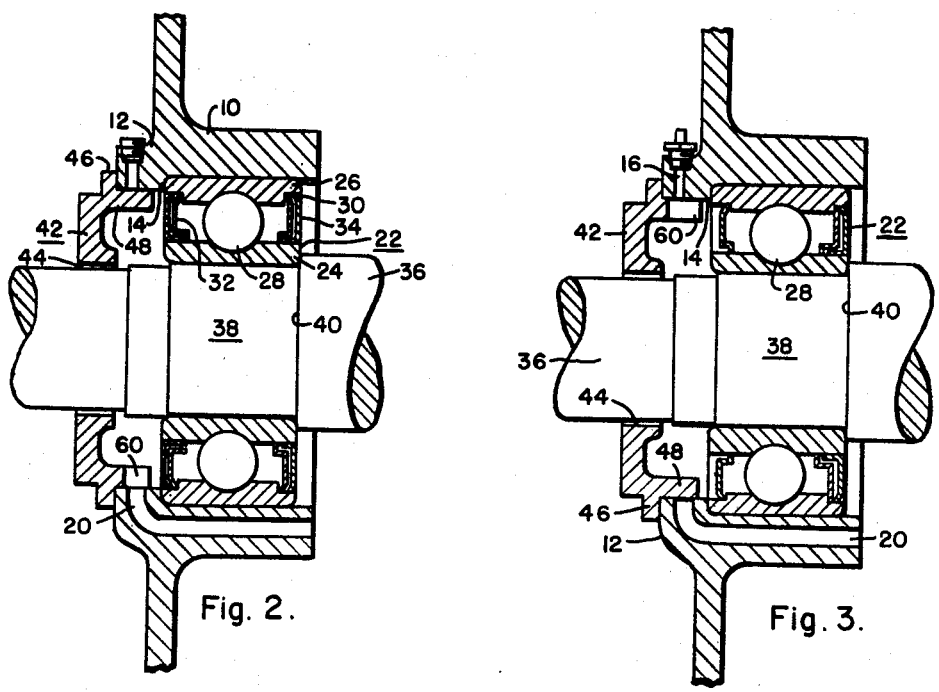
Fig. 1.
Fig. 2.
Fig. 3.

2,937,059
BEARING ASSEMBLY

Ephraim H. Anderson, Buffalo, and James H. Penney, East Amherst, N.Y., assignors to Westinghouse Electric Corporation, East Pittsburgh, Pa., a corporation of Pennsylvania Application April 24, 1958, Serial No. 730,626

6 Claims. (Cl. 308—187)

The present invention relates to a bearing assembly and more particularly to a bearing assembly which can be used for greasable or prelubricated applications.

For many applications it is desirable to provide a prelubricated bearing assembly, particularly in dynamo-electric machines. These bearing assemblies are designed to last for the life of the machine without further need for lubricating them. Double seals are provided which extend between the races on each side of the bearing to prevent leakage of grease or other lubricant from the bearing as well as to prevent contamination of the lubricant by foreign particles and dust which may be drawn in to the machine as it "breathes." During the operation of the dynamo-electric machine, the temperature of the machine varies in accordance with the load. Consequently, the air pressure in the machine housing fluctuates and the machine "breathes." When the machine is heavily loaded, its temperature rises so that air pressure in the housing also rises. If the load is decreased or the machine switched off, the temperature falls so that air pressure in the casing is decreased and air is expirated into the casing through the bearing. As a result, dust particles are likely to be drawn into the bearing and lubricant is sucked from the bearing into the machine housing. The aforementioned seals prevent the fouling of the lubricant due to "breathing."

In this type of bearing assembly, an air by-pass through the bearing bracket is provided to permit "breathing" although the bearings are sealed.

For certain applications a sealed pre-lubricated bearing assembly is desirable. Such an arrangement eliminates the possibility of over-greasing and under-greasing. Further advantages are apparent when the motor is located in a position where it is difficult to reach for greasing or in an extremely contaminated area.

Under certain conditions, however, it is more desirable to provide a bearing assembly which can be lubricated from time to time. For example, when a machine is run continuously for long periods of time, perhaps daily or weekly, the original lubricant may require flushing and replacement. For various reasons it may be advantageous to provide a greasable bearing assembly. Presently known bearing assemblies are either prelubricated or greasable and cannot be converted from one to the other. It is often necessary to transfer a machine from one type of service to another. The new application of the machine may necessitate changing from a prelubricated bearing to one that can be lubricated. Furthermore, one user may require machines of each type for different applications requiring them to stock different replacement parts for each.

It is, therefore, an object of this invention to provide a bearing assembly which can be utilized either as a pre-lubricated bearing assembly or as a greasable assembly.

Another object of this invention is to provide a bearing assembly of the pre-lubricated type which includes elements for converting it to a greasable bearing assembly.

A further and more specific object of this invention is to provide a bearing assembly utilizing a cap which can be rotated to open a grease outlet and inlet thereby converting the assembly to a greasable type in a simple and efficient manner.

Other objects and advantages of the invention will become apparent from the following detailed description, taken in connection with the accompanying drawings, in which:

Figure 1 is a front elevation view of the cap utilized in the bearing assembly of this invention.

Fig. 2 is a longitudinal sectional view of the bearing assembly taken on line II—II of Fig. 1 in which the cap is mounted in the prelubricated position, and Fig. 3 is a longitudinal sectional view of the bearing assembly of this invention taken on line II—II of Fig. 1 with the cap mounted in a greasable position.

Refering now particularly to Figs. 2 and 3, there is shown a bearing bracket and bearing assembly for a dynamo-electric machine. A bearing bracket 10 is shown as a hollow cylindrical member open at its ends having an annular flange 12 on its outermost end which forms a shoulder 14 extending from the inner surface of the bearing bracket. A grease inlet opening 16 and a grease outlet opening 18 are bored radially through flange 12. An air by-pass opening 20 is formed in bearing bracket 10 and extends from the inner surface of flange 12 radially and then proceeds longitudinally through the wall of bearing bracket 14. A ball bearing 22 having an inner race 24 and an outer race 26 is received in the bearing bracket 10. By way of example, anti-friction members between the inner race and outer race are shown as balls 28, but it will be, of course, understood that any suitable anti-friction member may be used, as for example rollers. Outer race 26 of bearing 22 is formed with an annular notch 30 adjacent each end. Notch 30 has a radially extending side wall and a longitudinally extending side wall perpendicular to the radially extending wall. A pair of inner seals 32 are secured to the radially extending walls of notch 30 in any suitable manner and extend radially inwardly toward the inner race 24 of bearing 22. A pair of outer annular seals 34 are secured in any suitable manner to the inner race 24 of bearing 22 and extend radially outward toward outer race 26 and span substantially the entire distance between the races 24 and 26. Prior to securing the seals to the bearing 22, the bearing is filled with a suitable lubricant. The seals 32 and 34 are secured in such a manner as to be readily removable if desired.

A rotatable shaft 36 is received and supported in bearing 22. The shaft 36 has a reduced end portion 38 forming a shoulder 40 which bears against the inner end of the inner race. The outer end of the outer race 26 bears against shoulder 14 of flange 12. Inner race 24 may be secured to the reduced end portion 38 of shaft 36 in any suitable manner as for example, by a pressed fit.

An outer bearing cap 42 is provided to close the outer end of the bearing bracket 10. Outer bearing cap 42 has a central opening 44 to receive the reduced end portion 38 of shaft 40. The aperture 44 provides a very small clearance between the shaft 36 and the bearing cap 42. Bearing cap 42 has an annular flange 46 extending radially outward and an annular flange 48 extending longitudinally inward. Flange 46 abuts the outer end of flange 12 on bearing bracket 10. The outer periphery of flange 48 abuts the inner periphery of flange 12 and extends inwardly beyond the openings 16, 18 and 20. A pair of ears 48 and 50 are secured integrally with flange 46 and at diametrically opposite positions on the flange 46. Ears 48 and 50 have bolt receiving openings which correspond to and are in alignment with bolt receiving openings on bearing bracket 10. The bearing cap 42 may be secured to the bearing bracket in any suitable manner as for example, by bolts 52 and 54 passing through bolt receiving opening in ears 48 and 50 and threaded in bolt receiving openings in the bearing bracket 10. Flange 48 on bearing cap 42 have formed therethrough notches 56, 58 and 60 as can best be seen in Fig. 1. Notches 56 and 58 are each circumferentially spaced from notch 60 a distance equal to the distance between the grease inlet 16 and grease outlet 18. The notches 56, 58, and 60 are further positioned relative to bolts 52 and 54 so that when the cap is mounted in one position on the bearing bracket 10, notches 56 and 58 will be out of alignment with grease inlet 16 and 18 while notch 60 will be aligned with air by-pass opening 20. The bolts 52 and 54 may be removed from the cap 42 which may be rotated through 180° thereby mounting the cap with bolt 52 in ear 50 and bolt 54 in ear 48. In this case openings 56, 58 and 60 are so arranged that notch 60 and either notch 56 or 58 will be in alignment with grease inlet 16 and grease outlet 18, respectively, and none of the notches 56, 58 or 60 will be in alignment with air by-pass opening 20.

When none of the notches 56, 58 or 60 are in alignment with openings 16 and 18, the bearing assembly described is a prelubricated bearing assembly which requires no lubrication from time to time. The lubricant in the bearing will last for the life of the machine under most operating conditions. In this condition the air by-pass opening 20 being in alignment with notch 60 permits the motor to "breathe," the air leaving the motor housing through the by-pass opening 20 and notch 60 and out through the clearance between the bearing cap and the shaft. Air may also be drawn in through the clearance between the shaft and opening 44 and enter the housing through the notch 60 and by-pass opening 20 without passing through the bearing. The seals 30 and 32 prevent any contaminants that may be contained in the air from entering the bearing and also the lubricant from being drawn out of the bearing into the housing.

If it is desired to utilize the assembly as a greasable assembly which can be lubricated from time to time, bolts 52 and 54 may be removed. The bearing cap 42 may be rotated through 180° and the bolts 52 and 54 may be reinserted to secure the bearing cap 42 to the bearing bracket 10. In this position the notches 60 and 56 are in alignment with grease inlet opening 16 and grease outlet 18, respectively. Air by-pass opening 20 is closed. In this case, the outer seal 30 on the outer end of bearing 22 may be removed to permit entry of lubricant between races. Seals 30 and 32 on the inner end of the bearing will prevent the lubricant from being drawn into the motor housing. In this application of the bearing assembly the air by-pass opening 20 is closed. This is necessary to prevent lubricant which is introduced into lubricant inlet 16 from passing through the by-pass opening 20 into the machine housing. Outlet opening 18 is opened to permit escapement of excess lubricant.

In the embodiment illustrated in the drawings notch 56 is utilized to provide an opening for grease outlet 18 when notch 60 is in alignment with grease inlet 16. Notch 58 is an auxiliary notch provided to increase the versatility of the bearing cap 42. It may sometimes be necessary to locate the grease outlet opening 18 in the opposite side of the machine. This may become necessary because of the location of the machine in a position where the grease outlet would be inaccessible if it were located as shown in Fig. 1. In such a case auxiliary notch 58 would be utilized to provide an opening for grease outlet 18 while notch 56 would become an alternative or auxiliary opening.

It will now be apparent that a new type of bearing assembly has been provided which is very versatile in its applications. It is illustrated and described as applied to a dynamo-electric machine but it will be, of course, understood that this assembly may be used in any type of a machine having a rotating shaft. It is easily and efficiently convertible from a prelubricated sealed type bearing assembly to one that can be flushed and lubricated periodically. The new bearing assembly provides economy in manufacture because a single type of bearing assembly can be manufactured for either greasable or prelubricated applications thus, permitting more economical production on a larger scale. A single set of replacement parts is required for either application. The user may convert the machine from one type of service to another in a simple manner.

A specific embodiment of the invention has been shown and described for the purpose of illustration but it will be understood that various other embodiments and modifications are possible and are within the scope of invention.

We claim as our invention:

1. In a bearing assembly for a dynamo-electric machine, a substantially cylindrical bearing bracket open at its ends having a lubricant inlet opening, a lubricant outlet opening and an air by-pass opening, a cap for closing the outer end of said bracket, means for mounting said cap in a first position to open said grease inlet and outlet openings and to close said air by-pass opening, means for mounting said cap in a second position to close said grease inlet and outlet openings and to open said air by-pass opening, means for selectively securing said cap in said first or said second position, whereby said bearing assembly may be converted from a prelubricated bearing assembly to a greasable assembly.

2. In a bearing assembly for a dynamo-electric machine, a substantially cylindrical bearing bracket open at its ends having a lubricant inlet opening and a lubricant outlet opening, said openings extending radially outward from the inner surface of said bracket, a cap for closing the outer end of said bracket having an annular flange extending axially inward beyond said bracket openings and lying adjacent the inner surface of said bracket, said flange having circumferentially spaced passages extending radially therethrough, securing means circumferentially spaced 180 degrees for mounting said cap on said bracket, said passages being in alignment with said openings when said cap is mounted in a selected position and out of alignment with said openings when said cap is mounted in a position rotated 180 degrees from said selected position.

3. A bearing assembly for a dynamo-electric machine comprising a substantially cylindrical bearing bracket open at its ends having a lubricant inlet opening, a lubricant outlet opening and an air by-pass opening, said openings extending radially outward from the inner surface of said bracket, a cap for closing the outer end of said bracket having an annular flange extending axially inward beyond said bracket openings and lying adjacent the inner surface of said bracket, said flange having first and second circumferentially spaced passages extending radially therethrough, securing means circumferentially spaced 180 degrees for mounting said cap on said bracket, said first and second passages being in alignment with said lubricant inlet and outlet openings, respectively, when said cap is mounted in a selected position, said first passage, being in alignment with said air by-pass opening when said cap is mounted in a position rotated 180 degrees from said selected position.

4. A bearing assembly for a dynamo-electric machine comprising a substantially cylindrical bearing bracket open at its ends having a lubricant inlet opening, a lubricant outlet opening and an air by-pass, said openings extending radially outward from the inner surface of said bracket an anti-friction bearing supported in said bearing bracket, removable seal means on said anti-friction bearing for retaining lubricant in said bearing, a cap for closing the outer end of said bracket, means on said cap for selectively opening or closing said openings, means for mounting said cap to selectively open said lubricant openings and close said by-pass opening or to close said lubricant openings and close said by-pass opening, whereby said bearing assembly may be converted from a prelubricated bearing assembly to a greasable bearing assembly.

5. A bearing assembly for a dynamo-electric machine comprising a substantially cylindrical bearing bracket open at its ends having a lubricant inlet opening and a lubricant outlet opening, said openings extending radially outward from the inner surface of said bracket, an anti-friction bearing supported in said bearing bracket, removable seal means on said anti-friction bearing for retaining lubricant in said bearing, a cap for closing the outer end of said bracket having an annular flange extending axially inward beyond said bracket openings and lying adjacent the inner surface of said bracket, said flange having circumferentially spaced passages extending radially therethrough, securing means circumferentially spaced 180 degrees for mounting said cap on said bracket, said passages being in alignment with said openings when said cap is mounted in a selected position and out of alignment with said openings when said cap is mounted in a position rotated 180 degrees from said selected position.

6. A bearing assembly for a dynamo-electric machine comprising a substantially cylindrical bearing bracket open at its ends having a lubricant inlet opening, a lubricant outlet opening and an air by-pass opening, said openings extending radially outward from the inner surface of said bracket, and an anti-friction bearing supported in said bearing bracket, removable seal means on said anti-friction bearing for retaining lubricant in said bearing, a cap for closing the outer end of said bracket having an annular flange extending axially inward beyond said bracket openings and lying adjacent the inner surface of said bracket, said flange having first and second circumferentially spaced passages extending radially therethrough, securing means circumferentially spaced 180 degrees for mounting said cap on said bracket, said first and second passages being in alignment with said lubricant inlet and outlet openings, respectively, when said cap is mounted in a selected position, said first passage, being in alignment with said air by-pass opening when said cap is mounted in a position rotated 180 degrees from said selected position.

References Cited in the file of this patent

UNITED STATES PATENTS

| | | |
|---|---|---|
| 932,774 | Foster | Aug. 31, 1909 |
| 946,271 | Reeves | Jan. 11, 1910 |
| 1,216,031 | Wilcox | Feb. 13, 1917 |